Patented Feb. 24, 1953

2,629,665

UNITED STATES PATENT OFFICE 2,629,665

DIETETIC FOOD PRODUCT AND METHOD OF PREPARING THE SAME

James B. Gordon, Burlingame, Calif.

No Drawing. Application October 31, 1951, Serial No. 254,185

5 Claims. (Cl. 99—186)

The present invention relates to dietetic foods and more particularly to dietetic fruits, fruit juices, preserves, salad dressings and the like.

Many attempts have heretofore been made to reduce the percentage of carbohydrates in food products by substituting saccharin, sorbitol and other sweetening agents for sugar. None of these attempts has been successful to my knowledge because the characteristic taste and texture of sugar have not been successfully simulated with the result that the product is not palatable and oftentimes has a bitter or metallic taste.

The use of saccharin is commonplace as a substitute for sugar, but when employed as a sweetening agent in processing food products such as canned fruit and fruit juices a bitter taste results. Attempts to eliminate the bitterness by combining the saccharin with pectin or sorbitol have been made but such a combination has resulted in a metallic taste which greatly impairs the flavor of the product.

The main object of the present invention is therefore the provision of a dietetic food product in which the usual amount of sugar in such product is replaced by a sweetening agent which has no carbohydrate value and which imparts to the food the same characteristic taste as sugar.

The invention will first be described in connection with the preparation of canned fruits. In such a process the normal procedure is to pack the fruit in cans and then add a syrup which is essentially sugar dissolved in water and then seal the can and heat it to the desired temperature and for the requisite length of time to cook the contents.

It is customary for canneries to produce what is commonly known as "water pack" fruit for consumption by diabetics and others who must reduce their intake of sugar and carbohydrates. Such "water pack" fruit is identical to ordinary canned fruit except that water is substituted for the syrup. Obviously this mixture of fruit and water is unpalatable and disagreeable to the taste in that the water detracts from the natural flavor of the fruit by dilution whereas the addition of sugar or a sugar substitute tends to point up the natural flavor of the fruit by balancing the sugar-acid ratio or the apparent sugar-acid ratio.

Canned fruit

I have discovered that a syrup-like solution may be substituted for the sugar solution which will produce substantially the same taste and texture as the syrup. The composition of said solution to simulate a 40 degree sugar syrup is preferably as follows:

| | Grams |
|---|---|
| Soluble saccharin | .04 |
| 70% solution of D sorbitol | 3.40 |
| Carboxymethylcellulose | .30 |
| Sodium cyclamate | .30 |

Water to make total volume 100 c. c.

The above composition is given with reference to the weight of material for each 100 cubic centimeters of solution, but it will be noted that the quantities given are roughly equivalent to the percentage by weight of each material in the solution.

The bitter taste normally resulting from the use of saccharin is not noticeable when the above solution is employed in canned fruits and I have found that the weight of saccharin may be increased to .08 gram without adverse effects. A modified form of the invention in which saccharin is eliminated will subsequently be described, but insofar as the above formula is concerned it should be noted that the saccharin may be substantially reduced although the quantity specified is preferred. Inasmuch as saccharin is much cheaper than sodium cyclamate it is preferable to employ the former to whatever extent possible without adverse effects.

The 70% solution of D sorbitol, which is also known by the trade-name "Sorbo" has the effect of causing the sweetness of the solution to penetrate the fruit. The weight of the D sorbitol may be increased to 5.0 grams without adversely affecting the texture of the product. Reduction in the quantity of the 70% of D sorbitol results in reducing the penetration of the sweetening effect within the fruit, which is undesirable.

Carboxymethylcellulose in the amount given above has the effect of thickening the solution so as to give the texture of sugar. Increasing the weight from .3 gram to .5 gram will thicken the product slightly but a further addition in weight is not recommended because the solution becomes much thicker than the syrup customarily employed in non-dietetic canned fruits.

Sodium cyclamate is the sweetening agent which, when used with the other agents in the above described formula, very closely approaches the taste of sugar. The formula for sodium cyclamate, which is sometimes known as sodium sucaryl, is $C_6H_{12}O_6NSNa$ with the following molecular structure.

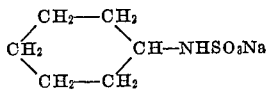

Substantially the same result may be obtained by the use of calcium cyclamate,

$(C_6H_{12}ONS)_2Ca2H_2O$ commonly known as calcium sucaryl. The amount of calcium or sodium cyclamate may be reduced to about .1 gram if desired and an increase in amount to about 1.0 gram will not adversely affect the taste but .3 gram is preferred.

When it is considered that the fruit in a can of fruit may be only about 6 to 7% sugar while the added syrup is about 40% sugar it is seen that there is a very substantial reduction in carbohydrates in the canned fruit when the above described solution is used in lieu of sugar syrup.

A modification of the above formula in which the saccharin is eliminated is as follows:

| | Grams |
|---|---|
| 70% solution D sorbitol | 3.4 to 5.0 |
| Carboxymethylcellulose | .3 |
| Calcium (or sodium) cyclamate | .3 to 1.3 |
| Water to bring total volume to 100 cc. | |

And a satisfactory formula in which both saccharin and sorbitol is eliminated is as follows:

| | Grams |
|---|---|
| Sodium (or calcium) cyclamate | .5 to 2.0 |
| Carboxymethylcellulose | .3 |
| Water to bring total volume to 100 cc. | |

The elimination of sorbitol is not recommended when the fruit is such that penetration of the sweetness into the fruit is desired. However, the omission of sorbitol does not detract from the taste and texture of the solution in which the fruit is canned.

It is to be understood that for fruits which are normally canned with a greater or less degree of sweetness in the syrup the ingredients above listed would be increased or reduced proportionately. For example, choice pears normally require a 30 degree syrup and choice peaches require a 40 degree syrup. The above formula would be modified by reducing the amount of each ingredient 25% if a 30 degree syrup were to be simulated for choice pears. The normal variation in such syrup is from 10 to 66 degree, the "degree" being the percentage of the sugar in the sugar syrup.

*Jam, jelly and fruit juices*

When it is desired to make dietetic jams, jellies or fruit juices the use of sodium cyclamate or calcium cyclamate is somewhat the same as in the above described process for making the syruplike solution for canned fruit. However, because of the additional requirement that the product must gel it is necessary to add a gelling agent such as pectin in the manufacture of jams and jellies.

A satisfactory formula for any kind of jam or jelly may be stated as follows:

| | Per cent |
|---|---|
| Sodium (or calcium) cyclamate maximum by weight | 1.0 |
| Low methoxyl pectin do | 1.5 |
| Fruit juice minimum by weight | 97.5 |

In addition to the above materials it is necessary to add citric acid or any other edible acid as tartaric, malic, ascetic etc. to adjust the pH value of the jelly to between 3 and 4. It will be understood of course that the amount of adjustment will vary with the particular type of fruit employed for the jelly.

In addition, calcium ion should be added in an amount sufficient to bring the calcium ion concentration to at least 25 milligrams for each gram of pectin used. Calcium ion concentration in excess of this amount has no deleterious effect except that the flavor of the product is slightly impaired. The addition of the calcium ion may be effected by almost any calcium salt such as calcium chloride, mono-calcium phosphate, di-calcium phosphate, calcium lactate etc.

It is important to note that "low methoxy" pectin must be employed in the above formula in order to form a gel. Ordinary pectin will not gel without the presence of a considerable amount of sugar.

For fruit juices in general the addition of sodium cyclamate or calcium cyclamate in an amount up to about 1% of the total weight will sweeten the product sufficiently to simulate the effect of sugar.

*Salad dressing*

In the manufacture of dressings such as whipped dressings which are high in starch content, carboxymethylcellulose and low methoxyl pectin may be used as a substitute for the starchy ingredients. These ingredients have the effect of producing a texture similar to that produced by starch.

Such whipped dressings may have a wide variety of ingredients but regardless of the particular formula employed the starchy ingredients may be omitted and the following materials substituted:

| | Per cent by weight |
|---|---|
| Carboxymethylcellulose | 1.0 |
| Low methoxyl pectin | 1.5 |

Some vegetable gums may be substituted for carboxymethylcellulose but it will be again noted that low methoxyl pectin must be employed in order to simulate the characteristic stiffness and texture of whipped salad dressings.

From the foregoing it will be apparent that many food products having a high carbohydrate content may be replaced by low carbohydrate foods which have the same texture and flavor as the high carbohydrate foods. It should also be noted that the characteristic aroma of such foods is not impaired by following the present invention.

The very specific formulas hereinbefore stated are not to be taken as restrictive of the invention as it will be obvious to those skilled in the art that minor variations may be made without departing from the scope of the invention as defined by the following claims.

I claim:

1. The method of sweetening dietetic canned fruit which comprises adding a syrup-like water solution which includes from .02% to 1.3% by weight of a material selected from a group consisting of sodium cyclamate and calcium cyclamate, and soluble saccharin in an amount less than .08% by weight.

2. A syrup for canned fruit comprising about .3% by weight of a material selected from a group consisting of sodium cyclamate and calcium cyclamate and about .04% soluble saccharin.

3. Canned fruit containing about .13% by weight of a material selected from a group consisting of sodium cyclamate and calcium cyclamate and soluble saccharin in an amount of .01% by weight.

4. Canned fruit containing from .005% to .025% saccharin and a material selected from a group consisting of sodium cyclamate and calcium cyclamate in amounts of from .05% to .2% of the total weight of product.

5. A dietetic food comprising fruit, saccharin and a material selected from sodium cyclamate and calcium cyclamate in an amount from 5 to 25 times the saccharin content.

JAMES B GORDON.

REFERENCES CITED

The following references are of record in the file of this patent:

UNITED STATES PATENTS

| Number | Name | Date |
| --- | --- | --- |
| 2,203,643 | Musher | June 4, 1940 |
| 2,275,125 | Audrieth et al. | Mar. 3, 1942 |
| 2,311,235 | Kuderman | Feb. 16, 1943 |
| 2,536,970 | Weast | Jan. 2, 1951 |

OTHER REFERENCES

"Water-Soluble Cellulose Ethers," Industrial and Engineering Chemistry, vol. 29, No. 9, Sept. 1937, pages 985–987.

"Hexitols in the Diabetic Diet," by H. C. Speel, Technical Representative, Atlas Powder Co., Wilmington, Del.

"Rayon Textile Monthly" (New York), 25:207 (Apr. 1944).

"The Chemical Senses," by Moncrieff-Leonard Hill Limited, 17 Stratford Place, W. 1, London, 1944, pages 255–257, 260–261.